United States Patent [19]
Proos et al.

[11] Patent Number: 5,335,935
[45] Date of Patent: Aug. 9, 1994

[54] AIR BAG COVER/MOLDED ARTICLE WITH INTEGRAL COVER LAYER OF LEATHER

[75] Inventors: Gary K. Proos, Grand Rapids; Theodore M. Sarver, Grandville; Donald W. Boehlke, Grand Rapids, all of Mich.

[73] Assignee: Plastic Mold Technology Incorporated, Grand Rapids, Mich.

[21] Appl. No.: 940,206

[22] Filed: Aug. 31, 1992

[51] Int. Cl.$^5$ ............................................. B60R 21/16
[52] U.S. Cl. .................................. 280/728 B; 280/731; 280/732
[58] Field of Search ........... 280/728 B, 728 R, 730 R, 280/731, 732, 743, 752; 428/43, 217

[56] References Cited

U.S. PATENT DOCUMENTS

| | | | |
|---|---|---|---|
| 3,654,062 | 4/1972 | Loew | 264/247 |
| 3,819,205 | 6/1974 | Dunford et al. | 280/731 |
| 3,907,330 | 9/1975 | Kondo et al. | 280/731 |
| 3,922,429 | 11/1975 | Welch et al. | 180/90 X |
| 4,053,545 | 10/1977 | Fay | 264/46.4 |
| 4,075,266 | 2/1978 | Theysohn | 264/92 |
| 4,120,516 | 10/1978 | Takamatsu et al. | 264/46.7 |
| 4,148,503 | 4/1979 | Shiratori et al. | 280/731 |
| 4,216,184 | 8/1980 | Thomas | 264/229 |
| 4,246,213 | 1/1981 | Takamatsu et al. | 264/46.6 |
| 4,276,346 | 6/1981 | Bramwell | 264/259 |
| 4,323,406 | 4/1982 | Morello | 264/275 |
| 4,325,568 | 4/1982 | Clark et al. | 280/731 |
| 4,334,699 | 6/1982 | Patzelt et al. | 280/731 |
| 4,369,157 | 1/1983 | Conner | 264/266 |
| 4,562,032 | 12/1985 | Gaudreau | 264/267 |
| 4,568,404 | 2/1986 | Herring | 180/90 X |
| 4,709,443 | 12/1987 | Bigley | 264/266 |
| 4,734,230 | 3/1988 | Rhodes, Jr. et al. | 264/46.4 |
| 4,746,385 | 5/1988 | Wagner et al. | 428/473 X |
| 4,752,083 | 6/1988 | Honda | 280/731 |
| 4,849,145 | 7/1989 | Hirsch | 264/46.4 |
| 4,852,907 | 8/1989 | Shiraki et al. | 280/743 |

FOREIGN PATENT DOCUMENTS

| | | |
|---|---|---|
| 2346296 | 9/1973 | Fed. Rep. of Germany . |
| 3904977 | 1/1990 | Fed. Rep. of Germany . |
| 4035975 | 5/1992 | Fed. Rep. of Germany ... 280/728 B |
| 0142937 | 8/1984 | Japan . |
| 63-184548 | 7/1988 | Japan . |
| 63-184549 | 7/1988 | Japan . |
| 88252683 | 7/1988 | Japan . |
| 1122753 | 5/1989 | Japan . |
| 1122754 | 5/1989 | Japan . |
| 275818 | 8/1989 | Japan . |
| 2244243 | 11/1991 | United Kingdom . |
| 2244682 | 12/1991 | United Kingdom . |

Primary Examiner—Margaret A. Focarino
Assistant Examiner—Peter C. English
Attorney, Agent, or Firm—Price, Heneveld, Cooper, DeWitt & Litton

[57] ABSTRACT

A molded air bag cover for vehicle supplemental occupant restraint systems includes a resinous plastic top wall having a leather or other covering layer bonded thereto and a securing member for attaching the cover to the vehicle. A frangible tear pattern in the covered top wall allows separation for air bag deployment. The tear pattern has a reduced thickness provided by an indented tear seam in the leather or other covering inner surface and an aligned groove in the resinous top wall. A method for making air bag covers includes enclosing leather or other covering material in a mold, advancing a projection on a mold portion against the covering material to form a tear seam, and injecting moldable material behind the covering material to form a backing layer bonded to the material while forming an aligned groove. Embossing a desired pattern in the leather or covering material with a design in the mold cavity is also disclosed. An article and method for molding leather covered, resinous articles having designs, indicia or enhanced leather graining embossed during molding are also disclosed.

27 Claims, 9 Drawing Sheets

U.S. PATENT DOCUMENTS

| | | | |
|---|---|---|---|
| 4,873,041 | 10/1989 | Masui et al. | 264/135 |
| 4,878,689 | 11/1989 | Mitzkus et al. | 280/731 |
| 4,895,389 | 1/1990 | Pack, Jr. | 280/732 |
| 4,898,706 | 2/1990 | Yabe et al. | 264/266 |
| 4,903,986 | 2/1990 | Cok et al. | 280/731 |
| 4,938,503 | 7/1990 | Muraoka et al. | 280/731 |
| 4,952,351 | 8/1990 | Parker et al. | 264/46.4 |
| 4,959,184 | 9/1990 | Akai et al. | 264/40.3 |
| 4,964,653 | 10/1990 | Parker | 280/732 |
| 4,968,057 | 11/1990 | Rafferty | 280/731 |
| 4,968,474 | 11/1990 | Ito | 264/513 |
| 4,989,895 | 2/1991 | Pearson et al. | 280/731 |
| 4,989,896 | 2/1991 | DiSalvo et al. | 280/732 |
| 4,989,897 | 2/1991 | Takada | 280/743 |
| 4,991,869 | 2/1991 | Hopf et al. | 280/731 |
| 4,994,224 | 2/1991 | Itoh et al. | 264/511 |
| 4,995,638 | 2/1991 | Shinto et al. | 280/731 |
| 4,997,707 | 3/1991 | Otawa et al. | 428/319.3 |
| 5,000,903 | 3/1991 | Matzinger et al. | 264/511 |
| 5,002,306 | 3/1991 | Hiramitsu et al. | 280/731 |
| 5,002,307 | 3/1991 | Heidorn | 280/743 |
| 5,006,188 | 4/1991 | Usui et al. | 264/259 |
| 5,009,452 | 4/1991 | Miller | 280/743 |
| 5,013,064 | 5/1991 | Miller et al. | 280/743 |
| 5,013,065 | 5/1991 | Kreuzer | 280/731 |
| 5,035,444 | 7/1991 | Carter | 280/728 |
| 5,053,179 | 10/1991 | Masui et al. | 264/257 |
| 5,056,814 | 10/1991 | Shiraki et al. | 280/743 |
| 5,060,971 | 10/1991 | Nanbu et al. | 280/743 |
| 5,062,663 | 11/1991 | Satoh | 280/743 |
| 5,064,217 | 11/1991 | Shiraki | 280/743 |
| 5,066,037 | 11/1991 | Castrigno et al. | 280/732 |
| 5,069,477 | 12/1991 | Shiraki | 280/732 |
| 5,080,393 | 1/1992 | Dixon, Jr. et al. | 280/732 |
| 5,082,310 | 1/1992 | Bauer | 280/743 |
| 5,084,122 | 1/1992 | Fukushima et al. | 280/728 |
| 5,087,069 | 2/1992 | Corbett et al. | 280/731 |
| 5,091,031 | 2/1992 | Strapazzini | 156/211 |
| 5,096,220 | 3/1992 | Nakajima | 280/728 |
| 5,096,221 | 3/1992 | Combs et al. | 280/728 |
| 5,096,652 | 3/1992 | Uchiyama et al. | 264/511 |
| 5,106,119 | 4/1992 | Swann et al. | 280/731 |
| 5,110,532 | 5/1992 | Hettinga | 264/257 |
| 5,110,647 | 5/1992 | Sawada et al. | 280/743 |
| 5,118,132 | 6/1992 | Nakajima | 280/728 |
| 5,143,401 | 9/1992 | Zushi | 280/728 B |
| 5,172,931 | 12/1992 | Baba et al. | 280/728 B |
| 5,172,932 | 12/1992 | Watanabe et al. | 280/728 B |

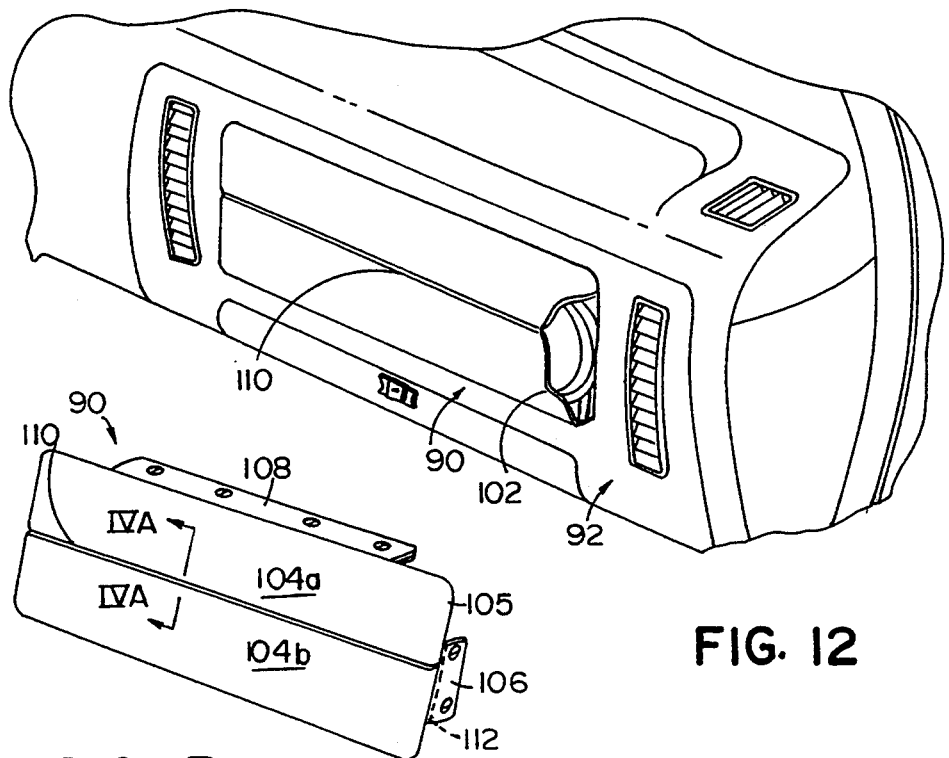
FIG. 12
FIG. 13
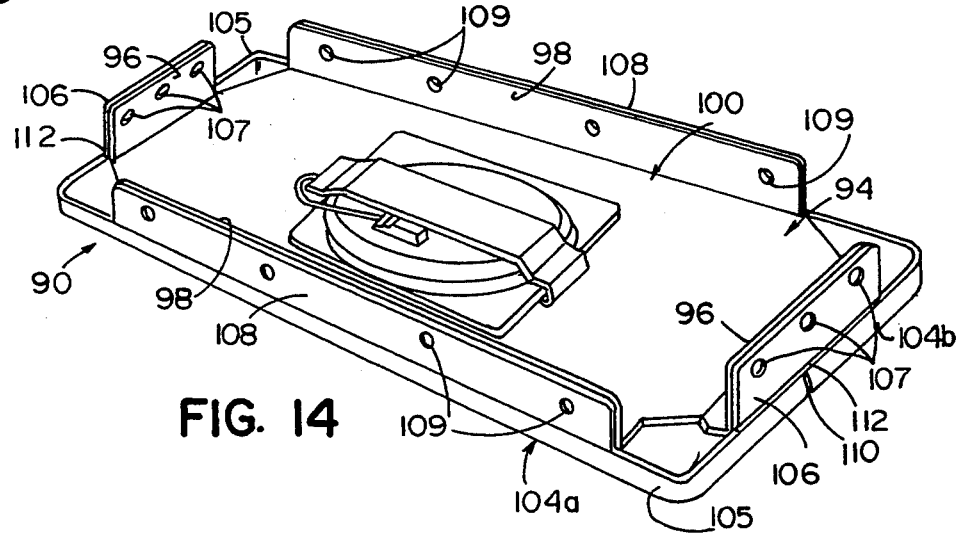
FIG. 14
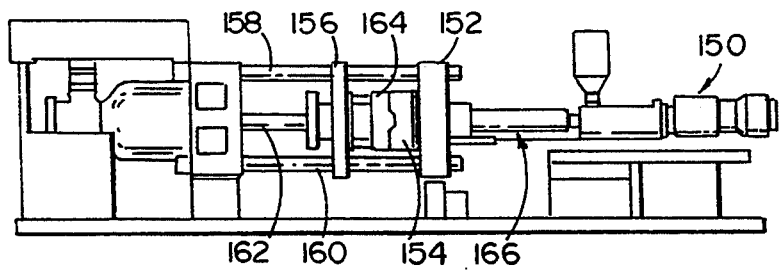
FIG. 15

AIR BAG COVER/MOLDED ARTICLE WITH INTEGRAL COVER LAYER OF LEATHER

BACKGROUND OF THE INVENTION

This invention relates to articles molded from resinous plastic material which incorporate a flexible, resilient covering layer thereovever, especially of leather. The invention also relates to methods for manufacturing such articles including injecting moldable resinous plastic material behind a leather or other covering layer such that the molded layer is securely bonded to the covering layer. A particular aspect of the present invention is directed to a cover for an occupant restraint air bag in a vehicle having an outer layer of leather or another flexible resilient covering material, and a method for manufacturing such covers, especially where the cover includes a frangible tear seam in a desired pattern adapted to separate upon inflation of an air bag to release the air bag into the vehicle when the cover is installed thereover.

The advent of supplemental occupant restraint systems for vehicles, better known as air bags, has required covers within the vehicle interior to house the air bag until needed. These covers must properly release the air bag into position in the vehicle when inflated upon sudden deceleration of the vehicle. Use of such covers has required efforts to properly match the covers to the vehicle interior decor and trim materials. In many vehicles, leather is used to cover portions of the instrument panel, seats, door panels, and steering wheel and post and it is desirable to incorporate leather on air bag covers incorporated in such vehicles. However, difficulties have arisen in attempting to use leather on air bag covers.

First, natural leather is a nonuniform material whose thickness, tear strength and surface finish vary over a wide range. Attempts have been made to glue or otherwise adhere pieces of leather over molded or other preformed air bag covers. However, release of the air bags using such covers has been unsatisfactory because the strength of the covering leather often prevents proper opening of the cover to release the bag. Difficulties have also arisen in obtaining proper adhesion of the leather to the preformed cover. The leather will loosen and/or peel away from the underlying part over time. Other attempts have incorporated leather sheets sewn or otherwise made from multiple leather pieces. However, such products have required raised, sewn seams and have not provided the desired smooth finished leather look desired by vehicle manufacturers. Moreover, the labor intensive costs associated with producing such covers have been high, and it has often been difficult to properly align the seams in such fabricated leather sheets with a desired separation pattern for the air bag cover. This also restricts proper release of the air bag.

A concurrent problem in the use of leather covered, molded articles generally has been the inability to obtain a proper leather grain appearance on the exposed surface of the article. Manufacturing procedures in applying leather covers to preformed articles with adhesives and the like have often diminished the naturally appearing grain in the leather and provided an almost smooth appearance instead of the desired natural leather grain. In addition, it has been difficult with past procedures to properly adhere the leather to a preformed article such that the leather remains secured to the article for proper appearance over its life.

Yet another problem encountered with covers for vehicle air bags has been the difficulty in obtaining proper air bag release over the wide range of temperatures in which the typical vehicle is expected to operate. In many air bag covers, a separation line of reduced strength has been provided such that the cover will separate into flaps which bend back to provide an opening through which the bag is released. However, in subzero temperatures, when the covers are made from various resinous plastic materials, the tensile strength of the plastic is greatly reduced due to the brittleness of the plastic at such low temperatures. Thus, prior known molded plastic air bag covers have often fractured prematurely in extremely low temperatures, or have failed to properly release the air bag upon inflation in such temperatures.

The present invention was conceived to overcome these and other problems encountered with leather covered molded plastic articles, and especially molded plastic air bag covers for vehicle restraint systems incorporating a leather or other flexible, resilient outer layer.

SUMMARY OF THE INVENTION

The present invention provides an article molded from resinous plastic material having an integral cover of resilient, flexible sheet-like material thereover, especially of natural leather. When adapted for use as an air bag cover for vehicle occupant restraint systems, a weakened tear seam is provided in the leather or other flexible cover sheet which is precisely aligned with a groove defining a reduced thickness in the backing layer of molded plastic material. The weakened area properly releases the air bag upon inflation in a uniform, consistent manner and in a wide range of temperature and other environmental conditions.

In addition, the invention provides a leather covered article of molded resinous plastic with the leather layer securely bonded to the surface of the molded article and a predetermined pattern formed in the leather surface. In addition, the invention provides methods for manufacturing these articles.

In one aspect, the invention is a cover for an occupant restraint air bag in a vehicle comprising a top wall covered with a layer of leather or other flexible, resilient covering material. The top wall has an outer surface adapted to face toward the interior of a vehicle when installed, an inner surface, and at least one securing member on the top wall for attaching the cover to a fixed vehicle portion over an inflatable air bag. The top wall is formed from resinous plastic material. The leather or other covering layer has an exposed surface and an interior surface including a frangible tear seam formed in a desired tear pattern on the interior surface, the tear seam having an indentation forming a reduced thickness portion in the leather or other covering material. The top wall has a groove defining a reduced thickness area aligned and in registry with the indentation of the tear seam. The resinous plastic material of the top wall outer surface is securely bonded to the interior surface of the leather or other covering layer including the tear seam indentation such that the cover is frangible through the aligned tear seam indentation and reduced thickness groove of the top wall for separation to release the air bag when pressure is applied to the top wall inner surface upon inflation of the air bag.

Preferred aspects of this form of the invention may include an indented groove on the exposed surface of the leather or other covering material, the groove extending along and being co-extensive with at least a portion of the tear seam. Also, the surface of the leather or other covering layer may be embossed with a predetermined pattern such as a leather graining to enhance the appearance of the article. The aligned tear seam and reduced thickness groove in the backing layer may include a series of spaced perforations therealong to facilitate separation when the air bag inflates. Also, adherence of the leather layer to the top wall may be enhanced by including an adhesive primer on the leather interior surface prior to molding.

In another aspect of the invention, a molded resinous plastic article is provided having a covering layer of leather with a predetermined pattern therein embossed by contact with an embossed mold surface during molding of the resinous backing layer. The inside surface of the leather layer is roughened prior to molding to include leather strands, filaments and/or projections which are securely embedded within the resinous backing layer during molding such that the leather layer and resinous backing layer are strongly bonded to one another.

In yet another aspect of the invention, a method for making a cover having a leather or other covering layer for an occupant restraint air bag in a vehicle includes enclosing a piece of leather or other covering material within the mold cavity of a mold apparatus, advancing a projection on a portion of the mold apparatus against the inner surface of the leather or covering material to form an indented, reduced thickness tear seam in a desired pattern, withdrawing the mold apparatus portion to form a cavity behind the leather or other covering material inner surface, introducing moldable, resinous plastic material into the cavity behind the leather or covering material inner surface to form a backing layer with the inner leather or cover surface including the tear seam bonded to the backing layer while the projection on the mold apparatus portion forms a reduced thickness groove in the backing layer aligned with the tear seam, followed by at least partially curing the backing layer in the mold apparatus and opening the mold apparatus and removing the cover.

In preferred aspects of this method invention, the leather piece may be preformed with heat to the shape of a male mold portion over which it is placed prior to molding. In addition, the resinous plastic material may be injected against the inner surface of the leather to force the leather against the surface of the mold to conform the leather to the shape of the mold cavity and to emboss any pattern formed in the mold surface into the exposed surface of the leather. In addition, spaced perforations through the tear seam and backing layer may be formed after molding and at least partial curing of the cover to also facilitate separation of the cover upon air bag inflation.

Another aspect of the method of the present invention is to make a leather covered, resinous plastic article having a predetermined pattern in the outer surface of the leather by providing a piece of the leather with an outer surface and a roughened inner surface, the roughened inner surface having leather strands, filaments and/or projections thereon. The leather is enclosed within the mold cavity of a mold apparatus, the mold cavity having a desired raised pattern thereon. A moldable resinous plastic material is introduced into the space between the roughened inner leather surface and a portion of the mold apparatus to form a backing layer such that the outer leather surface is forced against the raised pattern on the mold cavity surface to emboss the pattern in the outer leather surface. The roughened inner leather surface is securely bonded to the backing layer with the strands, filaments and/or projections embedded in the backing layer. Thereafter, the backing layer is at least partially cured in the mold apparatus after which the mold apparatus is opened to remove the cover.

The present invention provides numerous advantages over prior known air bag covers, molded articles, and methods for producing such covers and articles. The air bag covers, with either leather or another flexible resilient material, have a uniform separation strength for proper air bag release upon inflation. A uniform, smooth, high quality appearance for leather when molded to a resinous plastic backing layer is provided. The molding operation also precisely aligns the reduced thickness groove in the backing layer with the tear seam groove in the leather or flexible covering, all in one operation. The leather or other flexible covering is structurally supported by the reduced thickness backing layer such that strength is maintained and low temperature brittleness is overcome to assure proper air bag release. In addition, embossment of surface patterns in the leather or other flexible covering during molding enhances the appearance of the final article or air bag cover, especially when leather graining is formed in the mold surface. Finally, the method provides secure bonding and prevents separation of the leather or other cover from the backing plastic layer.

These and other objects, advantages, purposes and features of the invention will become more apparent from a study of the following description taken in conjunction with the drawings.

BRIEF DESCRIPTION OF THE DRAWINGS

FIG. 12 is a fragmentary, perspective view of a vehicle instrument panel incorporating a fifth alternative form of the air bag cover of the present invention installed over a passenger side occupant restraint/air bag system;

FIG. 13 is a top perspective view of the air bag cover of FIG. 12;

FIG. 14 is a bottom perspective view of the air bag cover of FIGS. 12 and 13 installed on an air bag system;

FIG. 15 is a schematic view of the typical plastic injection molding machine of the type preferably used to manufacture the present invention;

DESCRIPTION OF THE PREFERRED EMBODIMENTS

Figure 1:
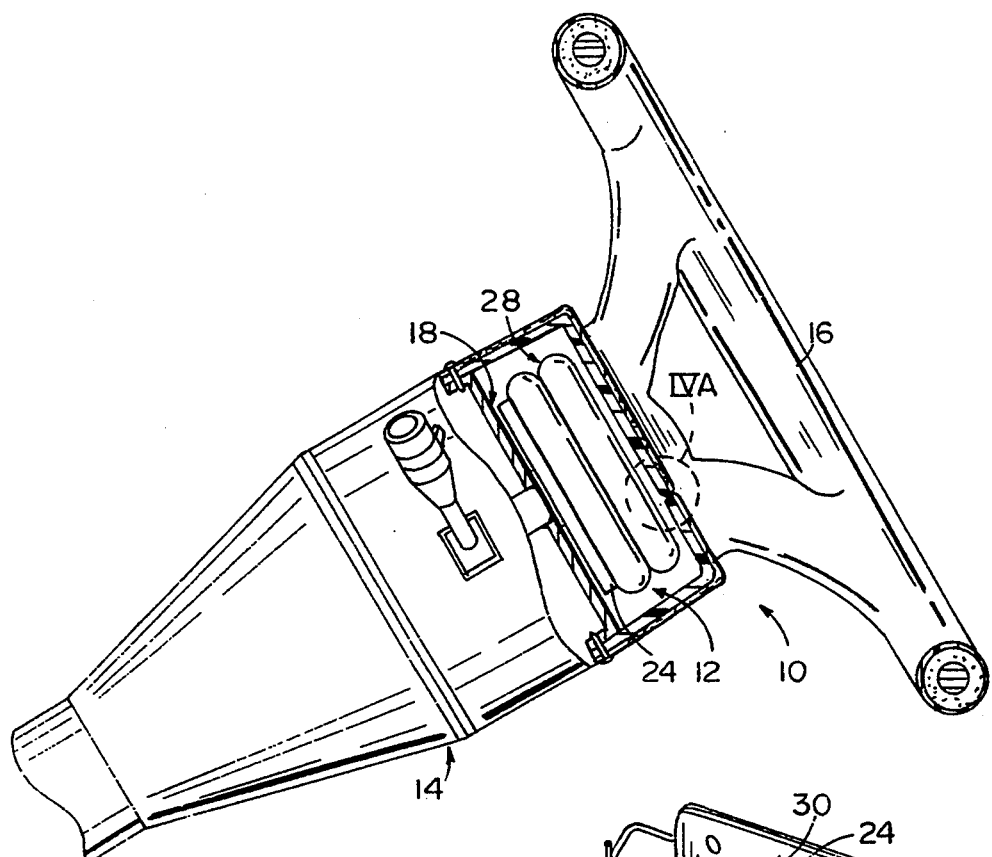
FIG. 1 is a side elevation of a typical vehicle steering post and steering wheel assembly incorporating an occupant restraint air bag system having an air bag cover incorporating the present invention.

With reference to the drawings in greater detail, several variations of a molded article having a leather or other resilient, flexible covering layer adapted for use with occupant restraint air bag systems for vehicles for both the driver and passenger sides are shown in FIGS. 1-14. As best seen in FIGS. 1-4 and 4A, a first embodiment 10 of the leather covered air bag cover is installed over an inflatable air bag system 12 mounted at the end of a steering wheel post 14 having a steering wheel 16 as shown. Occupant restraint air bag system 12 is typically mounted at the interior end of steering wheel post 14 within steering wheel 16 such that the air bag may deploy between the vehicle driver and the steering wheel post to prevent injury during an accident or other period of sudden deceleration. As shown in FIGS. 1 and 3, the occupant restraint air bag system typically includes a mounting plate 18 having flanges 20 at opposite ends through which screws or other fasteners 22 are inserted to secure the plate 18 to the steering wheel post 14. A gas canister 24 is mounted to extend outwardly toward this vehicle driver from plate 18 and is connected via appropriate wiring 26 to an acceleration sensor on the vehicle adapted to sense sudden deceleration and activate the canister to produce gas which inflates the collapsed air bag 28. Plate 18 also includes downturned flanges 30 on opposite edges to which are attached securing flanges 36 from the air bag cover 10 as is more fully described below. When air bag 28 is rapidly inflated by gas canister 24 upon deceleration, and air bag cover 10 is secured via flanges 30 to plate 18 which in turn is fixedly secured to steering wheel post 14, the pressure of the outwardly expanding air bag 28 breaks open the frangible portions of the air bag cover to allow deployment of the air bag to prevent injury.

Figure 2:
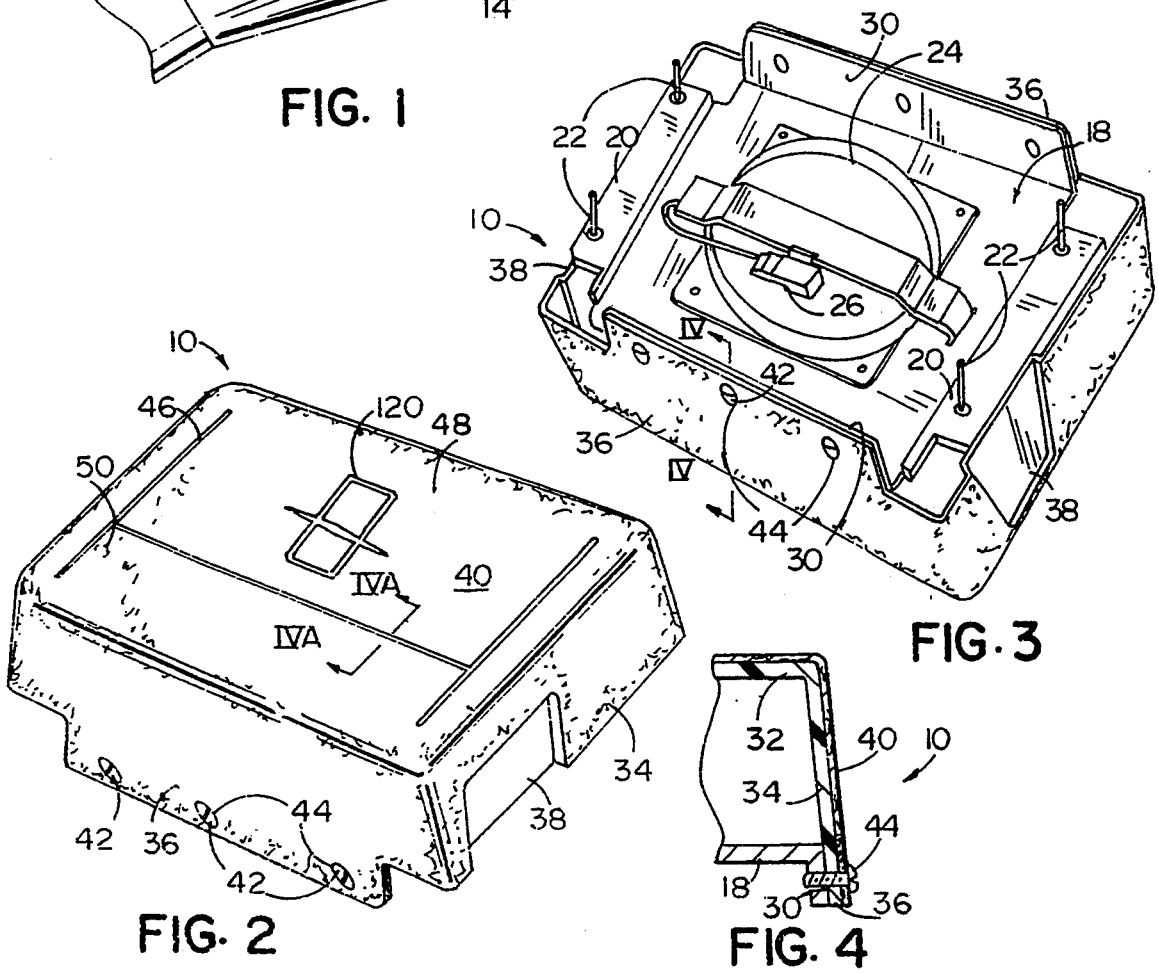
FIG. 2 is a top perspective view of the air bag cover shown in FIG. 1.
Figure 3:
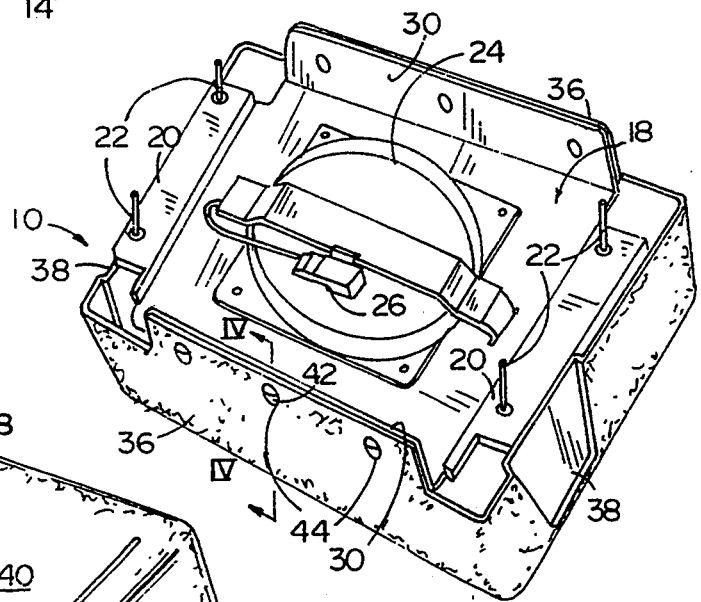
FIG. 3 is a bottom perspective view of the air bag assembly including the air bag cover of FIGS. 1 and 2.
Figure 4:
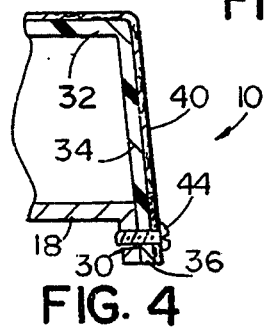
FIG. 4 is a fragmentary, sectional view of the air bag cover of FIGS. 1 through 3 when mounted on an air bag system.

As is best seen in FIGS. 2-4, air bag cover 10 is a multi-layered, leather covered, molded resinous plastic article having a box-like shape with an open bottom and including a molded plastic top wall or backing layer 32. Peripheral side walls 34 are integrally molded in one piece with wall 32 and extend downwardly from the top wall. On two opposing portions of the peripheral side wall 34 are formed downwardly extending securing flanges 36 which conform to the shape and overlie flanges 30 on air bag mounting plate 18. Recesses or indentations 38 may be formed in other areas of peripheral side wall 34 at opposed positions for receiving the spokes of the steering wheel 16 when the cover is installed. Such recesses or indentations can vary from vehicle to vehicle and be positioned as needed on the periphery of the cover 10 in keeping with the design of the steering wheel post and steering wheel for the particular vehicle on which the cover will be used.

Preferably, the moldable, resinous plastic material used for walls 32, 34 and flanges 36 of cover 10 is selected from polypropylene, polystyrene, ABS (acrylonitrile-butadiene-styrene), TPO (thermoplastic olefin), TPU (thermoplastic urethane), PPO (polyphenylene oxide) such as that sold as Noryl (T.M.) available from General Electric Plastics, or Kraton (T.M.), a rubber-based material available from Shell Oil Company. The durometer and elastic or flex modulus of the materials can vary depending on the desired stiffness of the cover. Typically, the durometer of the material will be in the range of about 40 Shore A to 95 Shore A, while the elastic or flex modulus will be in the range of about 80,000 to 450,000 psi.

Overlying the entire box-like enclosure formed by top wall 32 and peripheral side walls 34 is a layer of natural leather 40 having a finished outer surface and a roughened inner surface, the inner surface having strands, filaments and/or other projections which are embedded within the top wall and peripheral side wall portions to securely bond the leather to those portions during molding as will be more fully described below in connection with the present method. Top wall 32 structurally reinforces leather layer 40. As shown in FIG. 4, leather layer 40 extends to the bottom of flanges 36 and tightly adheres to and follows the form and shape of the underlying molded cover. Extending completely through leather layer 40 and the securing flange 36 are a series of securing apertures 42 in each of the flanges 36 adapted to receive screws or other fasteners 44 for securing the air bag cover to the mounting plate 18 as shown in FIGS. 3 and 4.

Figure 4A:
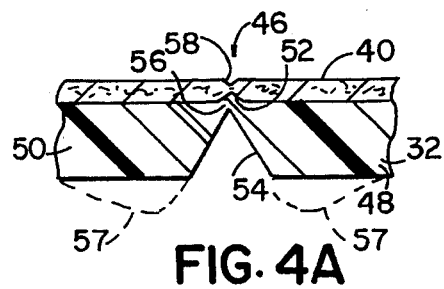
FIG. 4A is an enlarged, sectional view of the tear seam area of the air bag cover of FIGS. 1 through 4.

As is best seen in FIGS. 2 and 4A, air bag cover 10 includes a weakened, reduced thickness tear or separation line 46 which can be formed in any one of various patterns as shown, for example, in FIGS. 11A-11D. In the embodiment shown in FIGS. 2-4, tear/separation line 46 is in the shape of an elongated H to allow separation therealong and flexing of flaps or doors 48, 50 outwardly away from the steering wheel post and through which the air bag is deployed upon inflation. As shown in FIG. 4A, tear/separation line 46 is formed from several precisely aligned indentations and grooves in multi-layer cover 10. Leather layer 40 includes a V-shaped indentation 52 extending approximately ½ to ¾ of the distance through the leather thickness. Precisely aligned and in registry with indented tear seam 52 in leather layer 40 is a V-shaped groove 54 formed in the inner surface of top wall 32 of the cover 10. Groove 54 defines a reduced thickness area 56 formed by the molded plastic top wall which extends into indented tear seam 52. For structural rigidity on either side of groove 54, rounded, raised ridges 57 may be formed paralleling groove 54 as shown in phantom in FIG. 4A. optionally, the separation ability of the combined leather and top wall layers can be enhanced by forming a secondary V-shaped indentation or groove 58 in the outer surface of leather 40 aligned with and generally co-extensive with at least portions of tear seam indentation 52. In addition to helping provide uniform separation strength for the cover, indentation or groove 58 doubles as a styling line which conceals tear seam 52 which otherwise may be partially visible through the leather layer. Preferably, if leather layer 40 has a thickness of about 0.020 to 0.060 inches, the reduced thickness portion of the leather layer after formation of tear seam 52 will have a preferred thickness of about 0.010 to 0.015 inches, while reduced thickness area 56 of top wall 32 intermediate tear seam 52 and groove 54 will have a preferred thickness of about 0.010 to 0.025 inches. Thus, the combined thickness of the tear/separation line area of the cover 10 will preferably be within the range of about 0.020 to 0.040 inches As mentioned above, and as shown in FIGS. 11A-11D, the tear/separation line 46 can be formed in various patterns including a rectilinear line, an elongated H, a X-shape or an I-shape. In each, pressure from the inflating air bag beneath the cover will break the frangible tear/separation line and allow the flaps or door portions formed by the pattern to bend back allowing deployment of the air bag.

Figure 5:
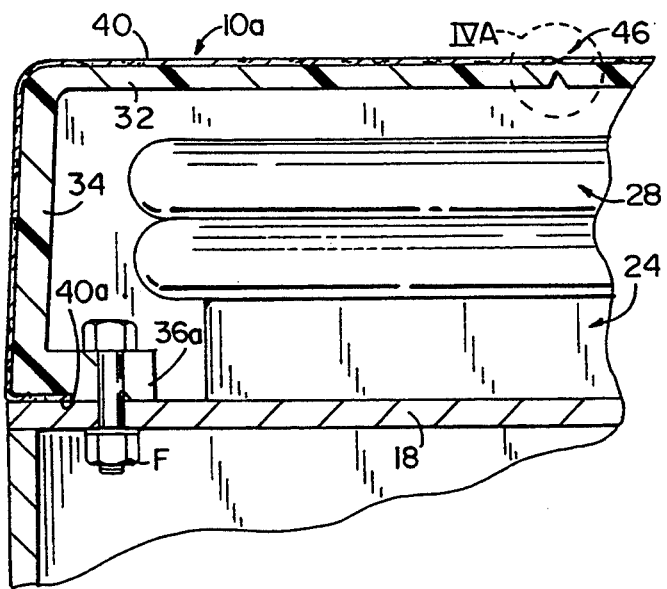
FIG. 5 is a fragmentary, sectional view of the steering wheel post and air bag assembly incorporating an alternate form of the air bag cover of the present invention.

Alternately, as shown in FIG. 5, where like numerals indicate like parts to those in FIGS. 1-4A, an alternate air bag cover 10a includes inturned securing flanges 36a extending laterally inwardly from peripheral side wall portions 34. In this embodiment, leather layer 40 extends downwardly over peripheral side walls 34 and inwardly under flange 36a at 40a around the entire periphery of the cover 10a. Thus, when flange 36a is bolted or otherwise secured to mounting plate 18, leather flap 40a is mechanically held against mounting plate 18 to help prevent the leather from pulling free upon inflation of the air bag 28 and separation of the tear/separation line 46.

Figure 6:
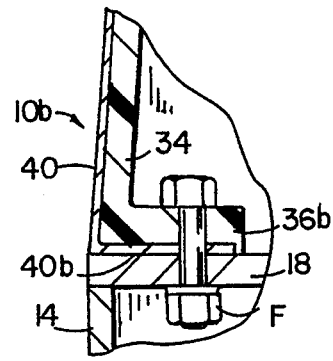
FIG. 6 is a fragmentary, sectional view of a portion of the steering wheel post/air bag assembly incorporating a second alternative embodiment of the air bag cover of the present invention.

In FIG. 6 yet another alternative form 10b of air bag cover 10 includes a securing flange 36b extending inwardly from peripheral side wall portion 34. In this version, an elongated leather flap 40b extends under substantially the entire securing flange 36b such that the securing bolt or fastener F extends through both flange 36b and leather flap 40b to further secure the leather and prevent it from pulling loose upon inflation of the air bag.

As shown in FIGS. 7-10, a fourth embodiment 70 of the leather covered air bag cover is illustrated. Cover 70 is adapted to enclose an air bag assembly 12' on a steering wheel post 14' in the center of a steering wheel 16' of the type having a contoured hub with spokes which merge into the shape and contour of the air bag cover 70. Cover 70 includes a top wall 72 and a series of four securing flanges 74, 76 all of which are molded integrally and in one piece with top wall 72 from a resinous plastic material such as polypropylene, polystyrene, ABS, TPO, TPU, PPO or Kraton (T.M.). Securing flanges 74, 76 are spaced inwardly from the downturned edges of top wall 72 and include securing apertures 78, 80 therethrough adapted to be riveted or otherwise secured to upturned mounting flanges 19' on mounting plate 18' by fasteners such as rivets R.

Figure 9:
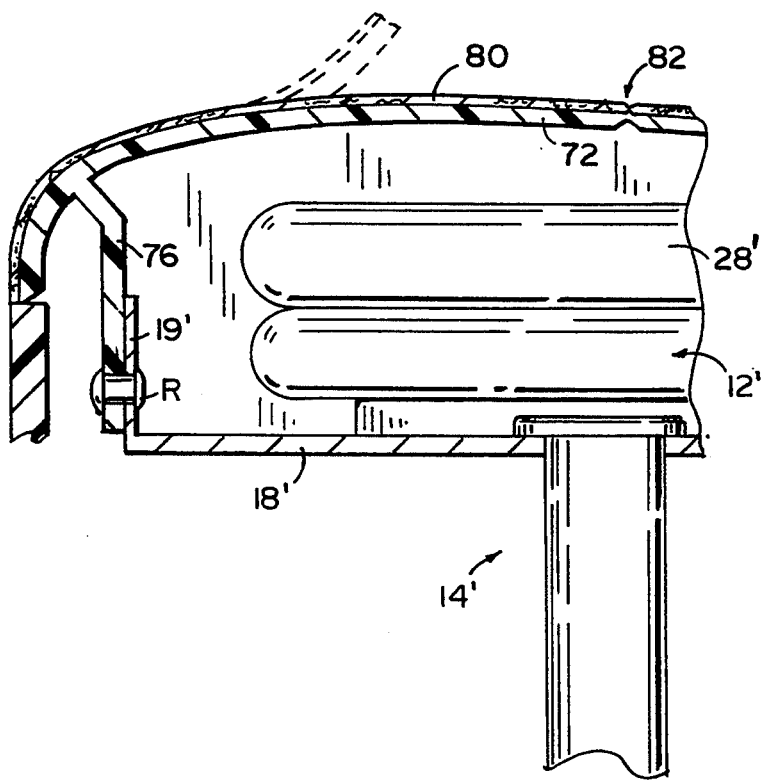
FIG. 9 is a fragmentary, sectional view of the air bag cover taken along line IX—IX of FIG. 8.
Figure 10:
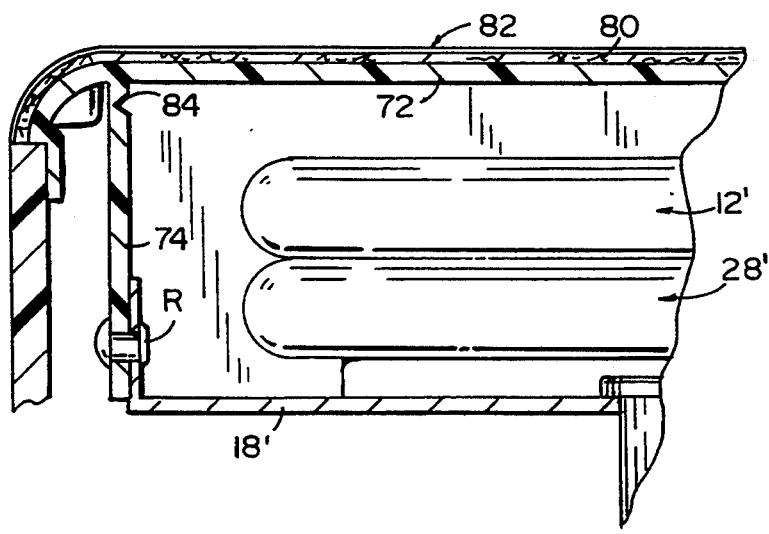
FIG. 10 is a fragmentary, sectional view of the air bag cover taken along line X—X of FIG. 8.
Figure 11A:
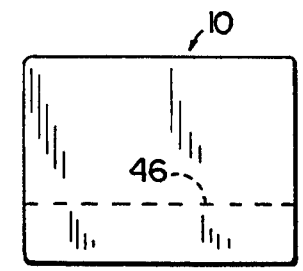
FIGS. 11A-11D illustrate variant forms of the tear seam pattern which may be included on the air bag covers of the present invention.
Figure 11B:
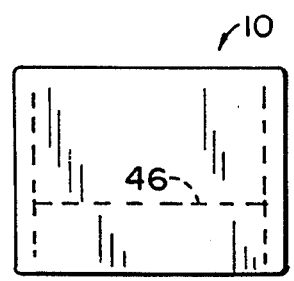
Figure 11C:
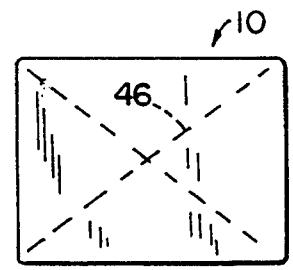
Figure 11D:
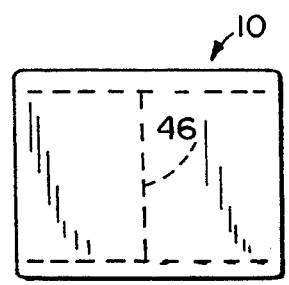

Overlying the entirety of the contoured, curved top outer surface of top wall 72 is a layer of natural leather 80 having a toughened inner surface embedded within top wall 72 during molding such that the leather is securely bonded to the entirety of the top surface. As in cover 10, cover 70 includes a weakened, reduced thickness tear/separation line 82 having a structure as shown in FIG. 4A including an indented tear seam on the inner surface of leather layer 80, an aligned V-groove in top wall 72 and an aligned, outer indentation or groove in the outer surface of leather 80. Tear/separation line 82 is preferably rectilinear and extends from side-to-side on the cover. In order to allow separation and flexing of the opposed portions of the top wall 72 for deployment of the air bag, however, securing flanges 74 include indented grooves 84 extending generally parallel to the inner surface of top wall 72 across the entirety of the flanges forming reduced thickness tear/separation lines therein. When air bag 28' inflates and forces top wall 72 outwardly, tear/separation line 82 will break or separate as will separation line 84 in flanges 74 at either end of the cover. This allows the opposed portions of the top wall to pivot upwardly for air bag deployment as shown in FIG. 9.

Referring now to FIGS. 12-14, a fifth embodiment 90 of the air bag cover is adapted for installation on the passenger side of an instrument panel 92 of a vehicle. Instrument panel 92 typically includes an occupant restraint air bag mounting plate 94 having downturned mounting flanges 96, 98 and an air bag inflation assembly centered therein over which an inflatable air bag 102 is secured inside cover 90. Cover 90 is molded from the same materials used for covers 10, 70 and includes an elongated rectangular top wall 104 molded in one piece with securing flanges 106, 108 extending away from the under surface of the top wall. In this version, the entire top wall including downturned peripheral edge 105 is covered with a layer of leather just as in covers 10 and 70. A tear/separation line 110 divides leather cover top wall 104 into sections 104a, 104b which flex outwardly when line 110 separates upon inflation of the air bag. In cover 90, however, the outer surfaces of flanges 106, 108 are not covered with leather since they are concealed behind the instrument panel front when cover 90 is mounted as shown in FIG. 12. In order to allow separation along line 110 and flexing of sections 104a, 104b, securing flanges 106 each include a reduced thickness, tear/separation line 112 similar to tear/separation line 84 in securing flange 74 of cover 70. Thus, when flanges 106, 108 are secured via fasteners extending through securing apertures 107, 109 therein to flanges 96, 98 respectively of mounting plate 94, inflation of the air bag will separate the tear/separation lines 110, 112 allowing sections 104a, 104b to flex outwardly to deploy the bag in front of the passenger side occupants of the vehicle. As in covers 10 and 70, the structure of top wall 104 at tear/separation line 110 is substantially identical to that shown in FIG. 4A with the leather layer having a tear seam indentation on its inner surface aligned with a V-shaped groove in the molded plastic top wall 104 and V-shaped indentation in the outer surface of the leather aligned with the tear seam indentation.

Each of the air bag covers 10, 70 and 90 is preferably formed from a moldable resinous plastic material as mentioned above which is injected behind a layer of natural leather having a roughened inner surface with strands, filaments and/or projections which embed within the moldable material during formation. In order to enhance the uniform separation along the tear/separation lines 46, 82 and 110 in the various embodiments of the air bag cover, each of the tear/separation lines may include spaced perforations (see FIGS. 24–26) formed through the combined leather and top wall layers along and within the outer indentation line to further weaken the combined layers and allow separation upon air bag inflation. This allows better accommodation of various tear seam configurations and part shapes. The method of forming such spaced perforations will be more fully explained below in connection with the preferred method.

In addition, the appearance of the covers 10, 70 and 90 may be enhanced by embossing patterns, designs or indicia on the outer surface of the leather covering layers during the molding operation. Insignia 120 (FIGS. 2, 7, and 8) may be formed in any of the air bag covers by including appropriate raised designs, indicia or insignia on the interior surface of the mold against which the leather is forced by injection of the plastic moldable materials therebehind during molding. Alternately, or in addition to the indicia or designs, the surface of the mold cavity may be acid etched to provide a simulated leather graining pattern which is transferred to and embossed in the outer surface of the leather during molding. Such leather graining enhances the natural grain of the leather to provide a more esthetically pleasing product, and also serves to conceal or diminish the prominence of natural occurring blemishes and imperfections in the leather itself.

In addition, as is described more fully below, bonding of the roughened side of the leather to the molded plastic top wall of covers 10, 70 and 90 may be enhanced by coating the leather with an adhesion promoting primer such as Jet Weld TE-030 available from 3M Company of St. Paul, Minn. on the roughened side prior to injecting the moldable material thereagainst during the manufacturing process. The heat during molding will activate the primer material and chemically bond the two materials thereby enhancing the above mentioned mechanical bond.

In addition, flexible resilient cover sheets may be used on air bag covers 10, 70 and 90 in place of the natural leather. Suitable covering materials include polyvinylchloride sheeting. With such materials, the tear seam indentations and tear/separation lines on the exterior surface may be formed just as with the leather layers, while the sheeting forming the covering material may be placed in the mold in the same fashion as described below for natural leather. The use of other cover materials provides flexibility and variations suitable for allowing use of the air bag covers in various passenger vehicle interiors.

DESCRIPTION OF THE PREFERRED METHODS

Referring now to FIGS. 15–26, the air bag covers 10, 70 and 90 as well as other molded parts incorporating the features of the invention, are preferably manufactured in a plastic injection molding machine 150 of the type shown in FIG. 15. Injection molding machine 150 typically includes a fixed, vertically oriented platen 152 to which a female mold half 154 including a mold cavity formed therein is secured. Opposed to platen 152 is a movable, vertically oriented, slidably mounted platen 156 which is guided for movement on rails or rods 158, 160 via a hydraulic ram 162 or the like. A male mold half 164 is mounted on platen 156 for movement into and out of engagement with female mold half 154 between open and closed positions. When the mold halves 154, 164 are closed, moldable, resinous plastic material may be injected into the mold cavity via an injection section 166.

Figure 16:
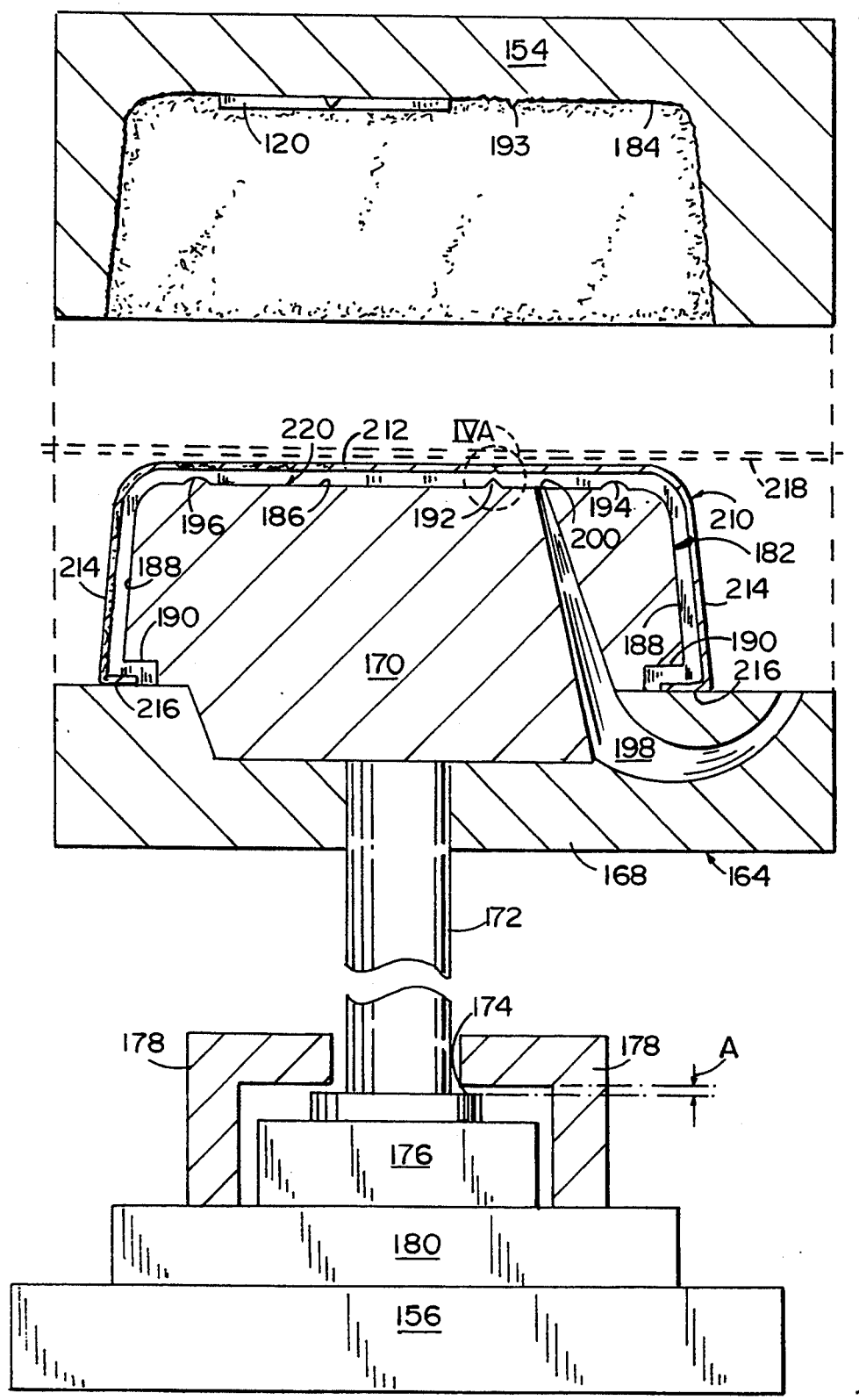
FIG. 16 is a broken, fragmentary, sectional view of a mold apparatus adapted to perform the method for making the occupant restraint air bag cover of the present invention and shown in open position.
Figure 17:
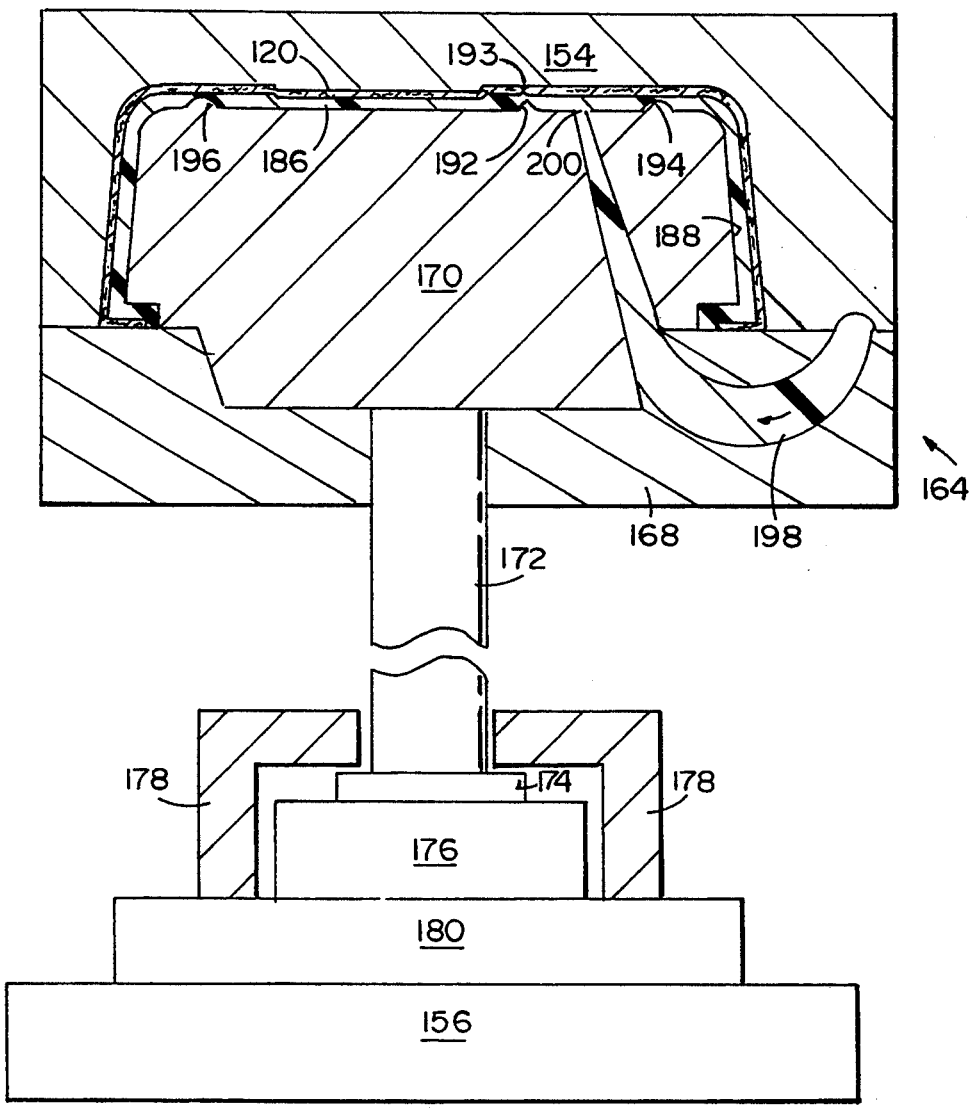
FIG. 17 is a broken, sectional view of the mold apparatus of FIG. 16 shown in closed position.
Figure 18:
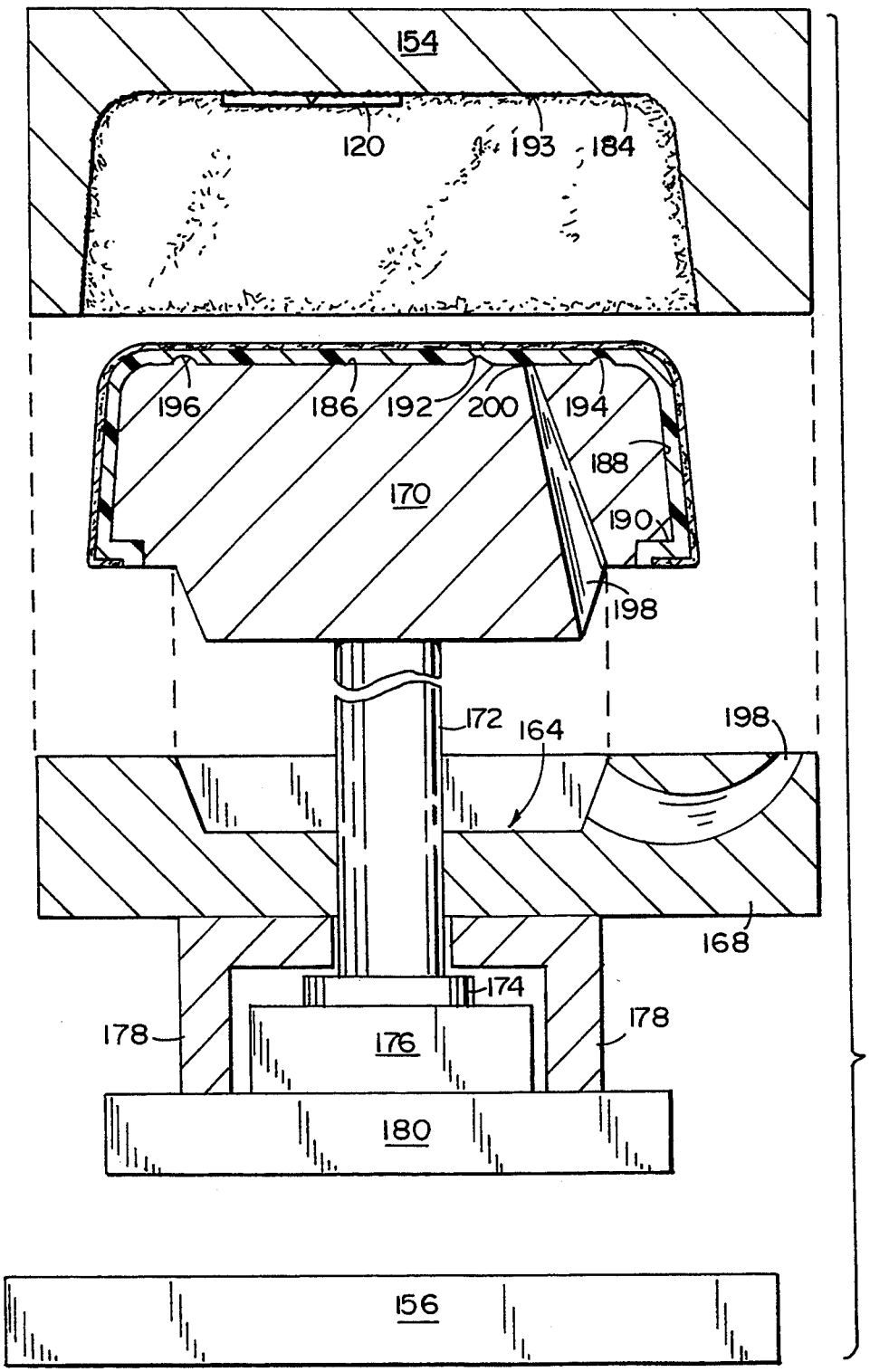
FIG. 18 is a broken, sectional view of the mold apparatus of FIGS. 16 and 17 shown opened after molding.

As shown in FIGS. 16–18, the preferred form of the female and male mold portions 154, 164 are illustrated. Male mold half 164 includes a support plate 168 which receives therein a lifter 170 mounted for reciprocal movement on lifter rod 172. Rod 172 is, in turn, mounted on stop shoulder 174 which, in turn, is supported on a mechanical or hydraulic driver mechanism 176 enclosed by housing 178 and supported on ejector plate 180. Ejector plate 180 is, in turn, supported on movable mold platen or mounting 156.

Lifter 170 includes a contoured mold surface 182 which parallels and conforms to the shape of female mold cavity 184 in female mold portion 154. As shown in FIG. 16, mold surface 182 of lifter 170 is shaped to form air bag covers 10a or 10b of FIGS. 5 and 6. Thus, surface 182 includes a top surface 186, slightly outwardly flared side surfaces 188 and undercut shoulders 190. In addition, an elongated, upstanding, inverted V-shaped ridge projection 192 extends along top surface 186. Spaced on either side of projection ridge 192 are rounded ridge projections 194, 196 which form hinge lines in the finished covers. A cashew-shaped injection gate 198 extends from an upper surface of ejector plate 168 in curved fashion into and through lifter 170 where it tapers to a small injection opening 200 at top surface 186.

As shown in FIG. 16, the manufacturing process initially starts with the mold portions 154, 164 in open position and lifter 170 retracted against support plate 168. In this position, a preformed leather piece 210, preferably shaped and molded to parallel the precise form of the mold surface 182, with heat in excess of 300° F. is placed over the mold surface such that it parallels but is spaced from that surface. Leather preform 210 includes a top surface 212, peripheral side surfaces 214, and inturned, lower flanges 216. The outer, exterior surface of leather preform 210 includes the natural leather graining resulting from finishing of the hide while the inner surface is roughened as results from the tanning process. The inner surface can also be mechanically roughened with a wire brush, or other machine or abrasive tool to form strands, filaments and/or other projections in the leather prior to placing in the mold or preforming. Use of the preform 210 is preferred since the shaping and molding thereof with high heat serves to preshrink the leather and avoids further shrinkage of the leather on the finished part during any subsequent heat cycling or post molding testing.

Alternately, in place of leather preform 210, a strip or piece of leather 218 (shown in phantom) may be placed between top surface 186 of lifter 170 and female mold cavity 184 in a generally flat orientation. Leather piece 218 includes a finished, grained outer surface facing the female mold cavity and a toughened inner surface, the roughness of which may be mechanically enhanced as described above.

After placement of the leather as above, the mold apparatus is closed by moving mounting plate 156 toward female mold portion 154 and fixed mounting plate 152 such that lifter 170 is moved into mold cavity 184 causing leather preform 210 or leather piece 218 to be moved into and conformed generally to the shape of mold cavity 184. Next, drive mechanism 176 is activated to move lifter 170 on rod 172 to advance the lifter toward the female mold cavity such that V-shaped projection 192 is engaged with and pressed into the inner surface of leather preform 210 or piece 218 against mold cavity 184 thereby forming a V-shaped, tear seam indentation in the shape of projection 192. As noted above, the tear seam indentation can have one of several overall configurations as shown in FIGS. 11A through 11D. This pattern will depend on the form in which projection ridge 192 is fashioned on the top surface 186 which can be rectilinear, H-shaped, I-shaped, or X-shaped as described above. The amount of advancement of lifter 170, and thus projection 192, into leather preform 210 or piece 218 against the surface of mold cavity 184 is governed by the space between stop shoulder 174 and the inside surfaces of housing 178, namely, shown as dimension A in FIG. 16. Preferably, such distance is about one-half to three-quarters of the thickness of the leather at the point of penetration such that the remaining thickness of the leather after formation of the tear seam will be between about 0.010 and 0.030 inches when the leather is between 0.020 and 0.040 inches thick initially. The reduced thickness of the leather in the tear seam weakens the leather and enables it to separate upon air bag inflation in a uniform and consistent manner which overcomes the natural inconsistencies and strength variations otherwise present in leather.

After formation of the tear seam with projection ridge 192, lifter 170 is withdrawn to its original position shown in FIG. 17, thereby forming a cavity 220 between the inner leather surface and the male mold surface 182. Moldable, resinous, plastic material is then injected into cavity 220 through gate 198 and opening 200 such that the the resinous material completely fills the cavity 220 along shoulders 190, peripheral side surfaces 188 and top surface 186 and simultaneously embeds the strands, filaments and/or projections on the roughened inner leather surface in the resinous material. Likewise, the resinous material fills the areas between the leather and the projections 192, 194 and 196 and fills the tear seam indentation formed by the projection ridge 192 such that the entirety of the leather is securely bonded to the resinous material after curing. Preferably, the resinous material is selected from the group including polypropylene, polystyrene, ABS, TPO, TPU, PPO or Kraton (T. M.) a rubber-based polypropylene material, and is typically injected into space 220 at a temperature of between about 350° and 600° F. at a pressure of between about 4,000 and 45,000 psi. Such injection pressure presses the leather 210 or 218 outwardly against the surface of mold cavity 184.

Optionally, prior to injection of the resinous material in space 220, and to the placement of leather preform 210 or piece 218 in the mold apparatus, the roughened inner surface of the leather may be coated with an adhesion promoting primer such as Jet Weld TE-030, mentioned above. Such primer is chemically activated upon engagement with the hot, moldable resinous material when injected against the leather thereby creating a chemical bond with the resinous material which enhances the mechanical bond of the leather surface strands, filaments and/or projections with that material.

After injection of the resinous material, the air bag cover is allowed to cure and/or set up with the mold apparatus in closed position, typically for a period of 30 to 120 seconds. Preferably, if a leather preform having inturned flanges 216 is used, the resinous material is allowed to only partially cure after which the mold apparatus is opened by withdrawing mounting plate 156 along with male mold portion 164 after which ejector plate 180 is moved away from plate 156 separating lifter 170 from ejector 168 plate as shown in FIG. 18. Thereafter, the still warm, flexible, partially cured air bag cover may be pulled away from mold surface 182 and lifted off that surface. The part is then allowed to fully cure prior to shipment and installation.

Figure 19:
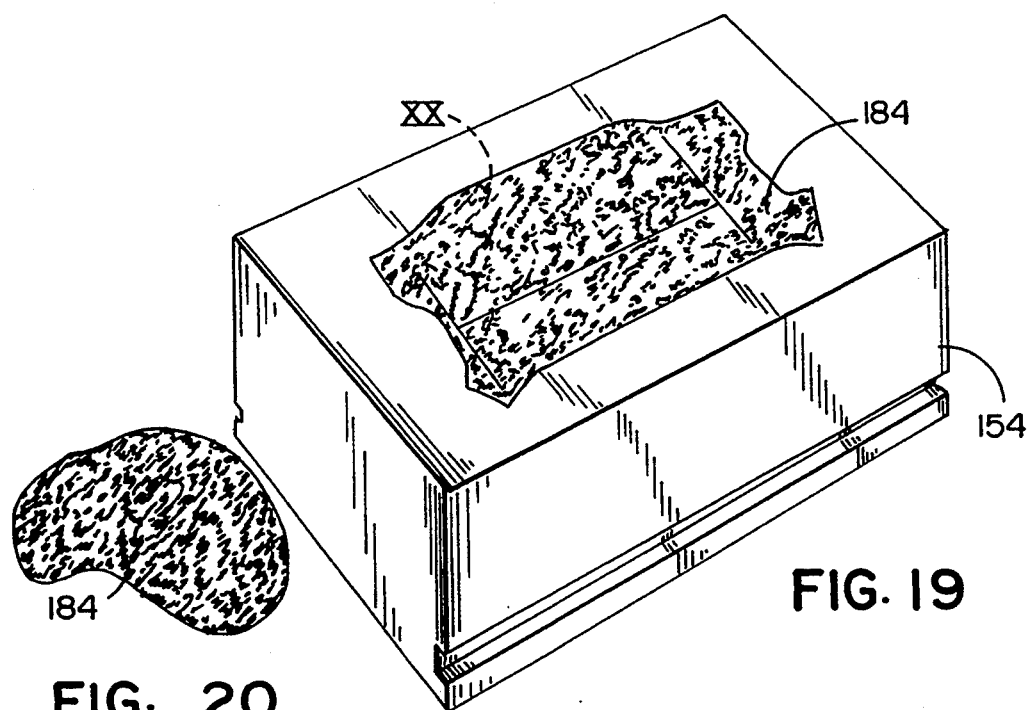
FIG. 19 is a perspective view of the female mold portion of the mold apparatus of FIGS. 16-18 with a portion broken away to show the leather grain pattern on the mold cavity surface.
Figure 20:
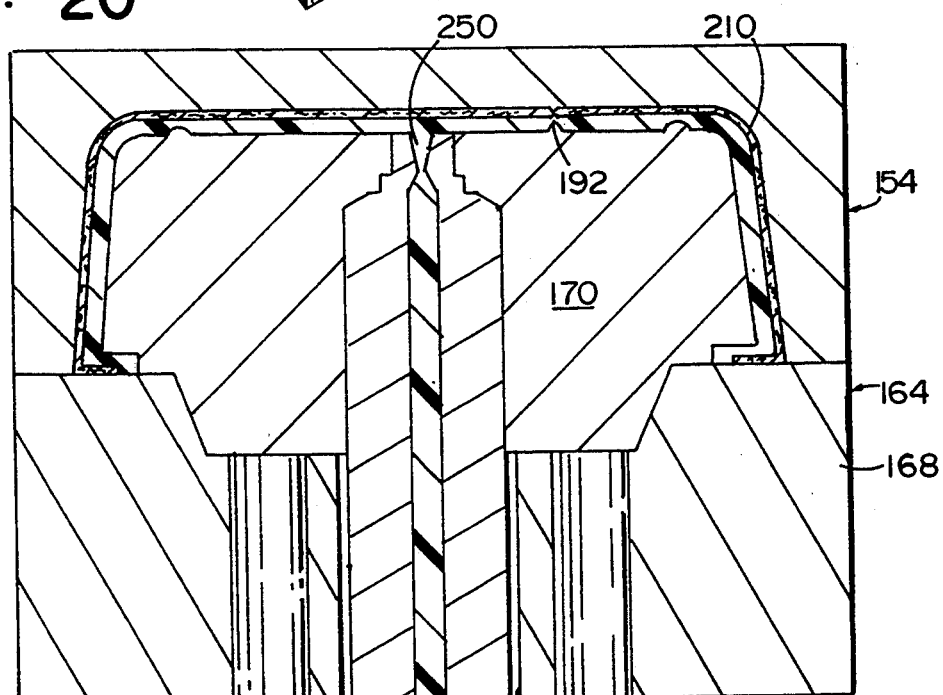
FIG. 20 is an enlarged view of the leather grain pattern on the mold cavity surface of FIG. 19.

Preferably, the mold surface of cavity 184 is embossed to provide a leather graining pattern as shown in FIGS. 19 and 20. Such leather grain pattern can be prepared by acid etching of the mold surface to provide a natural appearing leather grain which will enhance the appearance of the exterior leather surface or other covering material after molding. The pressure of the injection of the resinous material behind leather preform 210, piece 218, or other covering material will press the leather or other material against the leather grain pattern and imprints or embosses that leather graining in the exterior leather surface during the mold operation. In addition to enhancing the appearance of the finished article, the leather graining embossing also serves to hide surface imperfections or blemishes which occur naturally in leather thereby providing a more uniform quality for the finished product.

Figure 7:
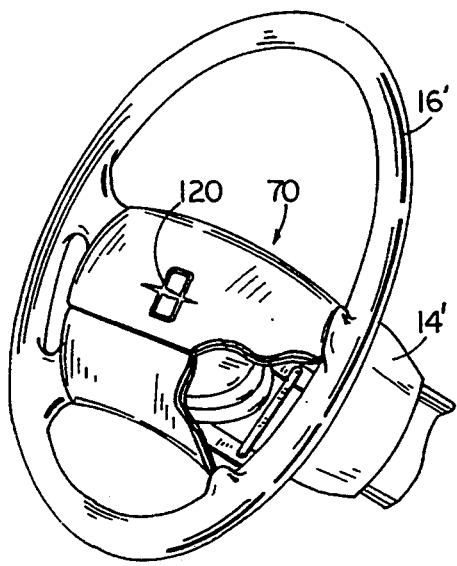
FIG. 7 is a perspective view shown partially in section of a third alternative form of the air bag cover of the present invention installed on a steering wheel post.
Figure 8:
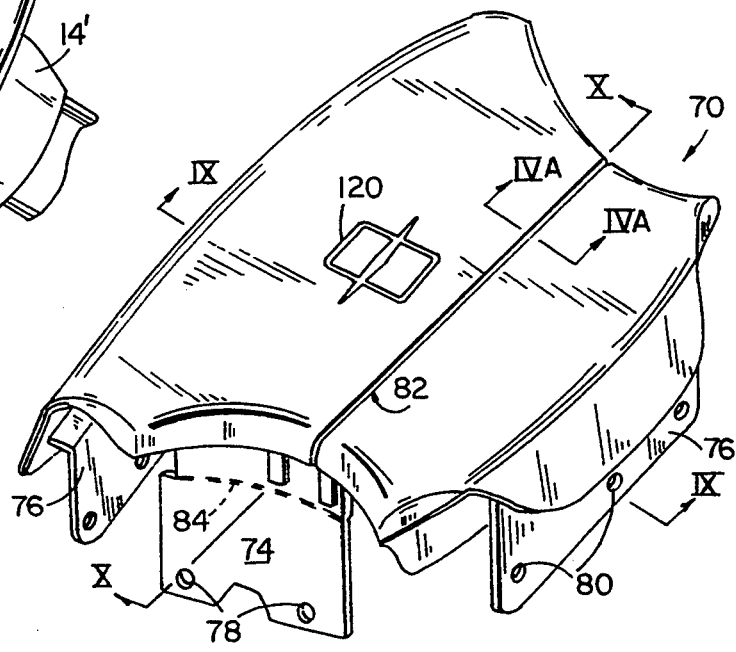
FIG. 8 is a top perspective view of the air bag cover of FIG. 7.

In addition, if desired, designs, logos, indicia or other graphics may be formed as raised patterns such as that shown at 120 in FIG. 16 which will also be imprinted in the exterior leather surface during the mold operation. Such patterns result in logos or insignia in the finished part as shown in FIGS. 2, 7 and 8.

Figure 21:
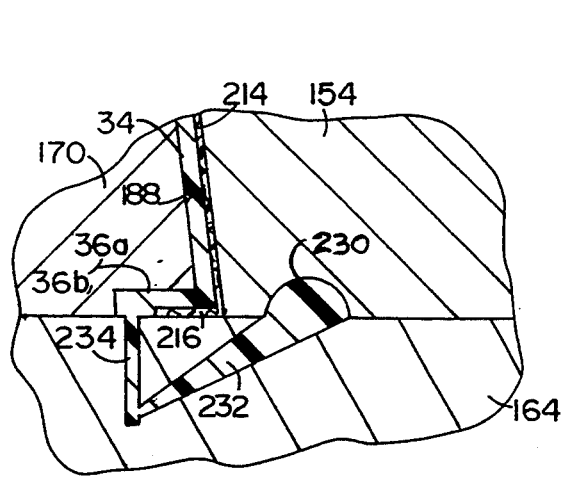
FIG. 21 is a fragmentary, sectional view of an alternate plastic injection gating system for the mold apparatus of FIGS. 16-18.
Figure 22:
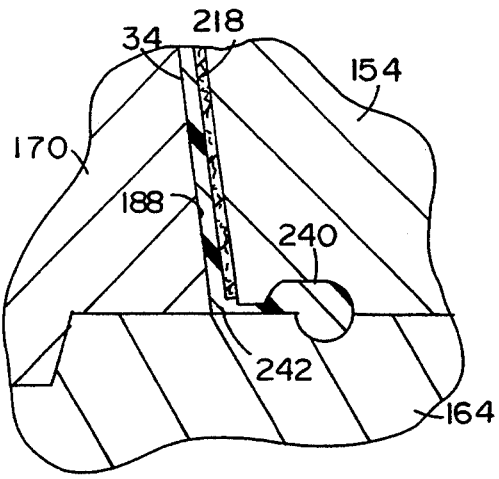
FIG. 22 is a fragmentary, sectional view of a second alternative plastic injection gating system for the mold apparatus of FIGS. 16-18.
Figure 23:
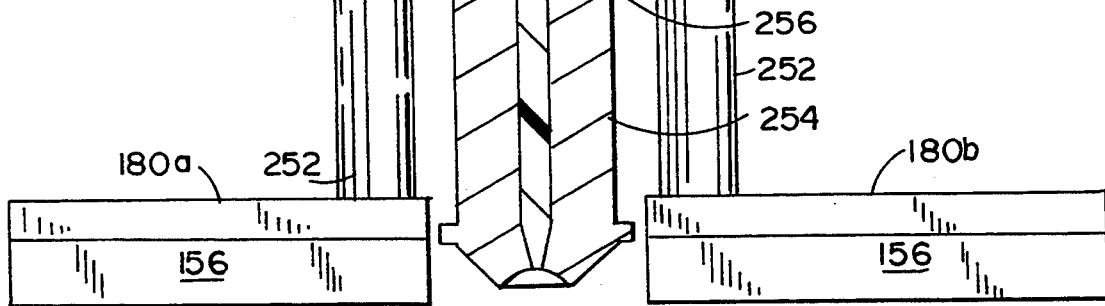
FIG. 23 is a sectional view of a third alternative plastic injection gating system for the mold apparatus of FIGS. 16-18.

As shown in FIGS. 21–23, alternate types of plastic injection gates may be used with the mold apparatus in place of cashew gate 198. For example, as shown in FIG. 21, for covers such as that shown at 10a or 10b in FIGS. 5 and 6, a tab gate 230 can be used including a tapered insertion 232 and a rectilinear runner 234 opening into the inturned flange 36a or 36b adjacent preformed leather flange 216.

Alternately, as shown in FIG. 22, an edge gate 240 can be used to form covers such as those shown in FIGS. 2–4 where there is no inturned flange on the bottom of the cover. In this case, the edge gate includes an opening 242 communicating with the lower end of the peripheral side portion adjacent mold surface 188.

Yet another alternate injection apparatus is shown in FIG. 23 including a center injection gate or opening 250. In this case, lifter 170 is supported on spaced lifter guide rods 252 which reciprocate through support plate 168 while a center injection member 254 extends through opening 256 in plate 168. Lifter guide rods 252 are, in turn, supported on spaced ejector plates 180a and 180b which, in turn, are supported on portions of the mounting 156. In this case, resinous moldable material is injected through a centered passageway in injector member 254 through opening 250 in the top wall of the cover member such that the material flows outwardly along the top wall, along the peripheral side walls, and into the inturned shoulder areas forming the securing flanges.

Figure 24:
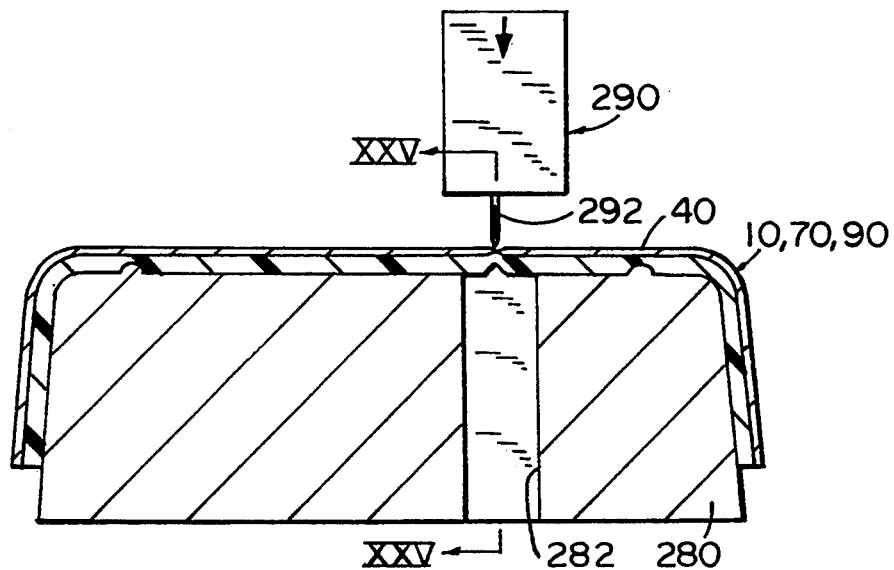
FIG. 24 is a sectional view of a perforation apparatus for performing the post molding, perforation step optionally used with the present method.
Figure 25:
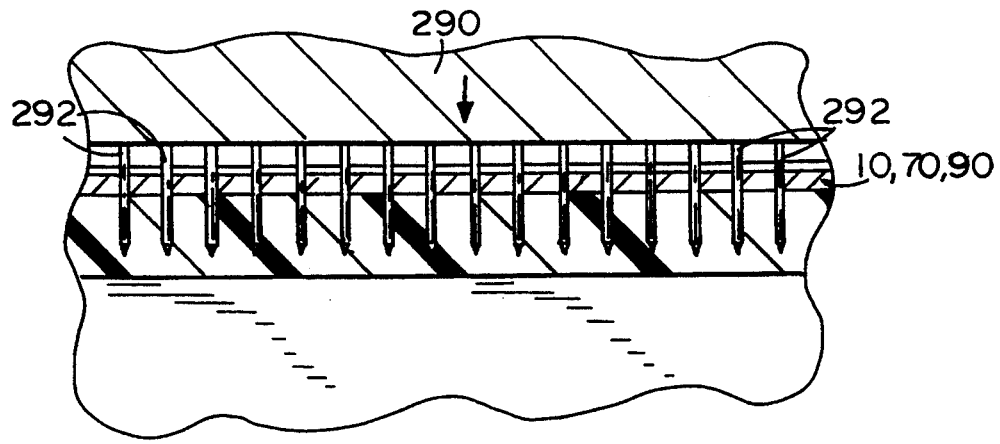
FIG. 25 is an enlarged, fragmentary, sectional view of the perforation apparatus taken along line XXV—XXV of FIG. 24.
Figure 26:
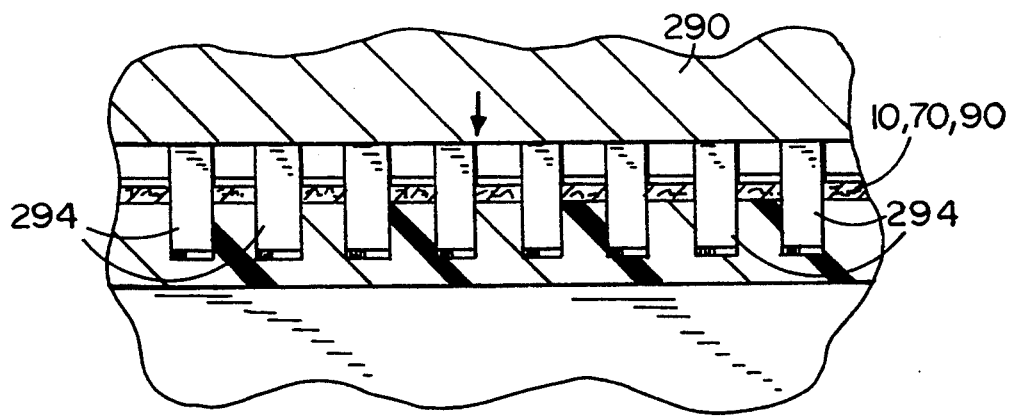
FIG. 26 is an enlarged, fragmentary, sectional view of an alternate perforation apparatus similar to that shown in FIG. 25.

Optionally, the molded, cured air bag cover 10, 70 or 90 may be further perforated along the formed, weakened tear seam area to further ensure proper separation for air bag deployment. As shown in FIGS. 24-26, additional perforation may be formed in the tear seam area by placing the molded cover 10, 70 or 90 over a contoured support 280 having a surface conforming to the shape of the inside surface of top wall 32 and side walls 34 and including an opening 282 aligned with the weakened tear seam/grooved area of the cover. The support 280 with cover 10, 70 or 90, thereon is positioned beneath a mechanical punch apparatus 290 having spaced, pointed rods, studs or needles 292 on its bottom surface. Studs 292 are aligned with the tear seam area and mechanism 290 is reciprocated toward support 280 such that the studs project through the tear seam at spaced positions therealong through both the leather and plastic backing layers thereby forming perforations at spaced positions which further weaken the tear seam area. Alternately, in place of studs 292, punch mechanism 290 may include spaced blades 294 thereby forming spaced, slot-like perforations. Alternate methods for weakening the tear seam area in the post molding perforation step include the use of pressurized water jets which project spaced streams of pressurized water through both layers of the cover to form spaced perforations, or the direction of high energy laser beams against the tear seam area at spaced positions to form perforations through the cover.

As is also shown in FIGS. 16-18, further uniformity and consistency in tear seam operation can be accomplished by further weakening the tear seam area of the cover during the molding process using a small, V-shaped ridge projection 193 formed on the surface of mold cavity 184 in opposition to ridge projection 192 on lifter 170. When projection ridge 193 is used, advancement of lifter 170 to form tear seam indentation 52 via projection 192 presses the leather simultaneously against projection 193 forming an indentation or groove 58 (see FIG. 4A) aligned and in registry with the tear seam indentation 52 on the inside surface. Indentation 58 thereby furthers weakens the strength of the leather in the tear seam area by further reducing the thickness of the leather and weakening its strength to provide more consistent operation. In addition, the formation of groove or indentation 58 serves as a styling line which hides and conceals any leather deformation caused by projection ridge 192 on the inner surface of the leather should it occur.

As is evident from the method description, other molded parts may be made with leather covering layers with the described method without the weakened, tear seam areas but including the embossed, leather graining or other insignia or designs in the surface thereof. Thus, other leather covered, molded parts for applications other than vehicles can be produced using the method taking advantage of the leather embossing and bonding to the resinous backing layer if desired.

In addition, other flexible, resilient sheet-like layers can be substituted for leather preform 210 or leather piece 218 in the molding process. For example, PVC sheeting may be used in place of leather piece 218 with the other steps of the method being performed substantially as described above in connection with FIGS. 15–26. In such case, the resinous backing layer material will be firmly bonded to the PVC sheeting or other covering layer, although the use of the adhesion promoting primer layer typically can be eliminated.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

We claim:

1. A cover for housing an occupant restraint air bag in a vehicle, said cover comprising:

a top wall having an outer surface adapted to face toward the interior of a vehicle when installed and an inner surface, a side wall extending at an angle and joined to said top wall and having outer and inner surfaces, and at least one securing member on said top wall for attaching said cover to a fixed vehicle portion over an inflatable air bag, at least said top wall and side wall being molded from resinous, plastic material;

said top and side wall outer surfaces being covered with and joined to a layer of natural leather, said leather layer being a preformed, preshrunk, preshaped leather piece including a top portion and a side portion, said leather layer extending from said top portion to said side portion such that it generally conforms to the desired shape of said cover prior to joining to said top wall and side wall, having an exposed surface and an interior surface, and including a frangible tear seam formed in a desired tear pattern on said interior surface, said tear seam including an indentation forming a reduced thickness portion along said tear pattern in said leather layer;

said top wall having a groove defining a reduced thickness area aligned and in registry with said indentation of said tear seam along said frangible tear pattern;

said resinous plastic material of said top and side wall outer surfaces being securely bonded and joined to said interior surface of said leather layer including said top and side portions during molding of said top and side walls, said top wall extending into said tear seam indentation and bonded to said indentation therewithin whereby said leather layer is smoothly and uniformly attached to said top and side walls without substantial distortion and said cover is frangible along said tear pattern through said aligned tear seam indentation and top wall groove for separation to release the air bag when pressure is applied to said top wall inner surface inflation of the air bag.

2. The cover of claim 1 including an indented groove on said exposed leather surface, said groove extending along and being co-extensive with at least a portion of said tear seam.

3. The cover of claim 2 wherein said exposed leather surface is embossed during manufacture with a predetermined pattern which remains visible in said exterior leather surface.

4. The cover of claim 3 wherein said predetermined pattern is a leather grain to enhance the appearance of the natural grain of said exposed surface of said leather layer.

5. The cover of claim 1 wherein said aligned tear seam and reduced top wall thickness includes a series of spaced perforations therealong to facilitate separation of said cover along said tear seam pattern.

6. The cover of claim 1 wherein said top wall is molded against said leather interior surface, said interior surface of said leather layer including an adhesive primer which promotes adherence and bonding of said leather to said top and side wall outer surfaces.

7. The cover of claim 1 wherein said top wall includes a periphery, said side wall forming said securing member, said side wall extending from said top wall periphery to form a box-like cover having a open bottom; said side wall including at least one opening therethrough for attaching said cover to a fixed vehicle portion.

8. The cover of claim 7 wherein said tear pattern of said aligned tear seam and groove are in a shape selected from the group consisting of 1) a line, 2) an H, and 3) an X.

9. The cover of claim 7 wherein said side wall includes an inturned flange, said leather layer extending around and covering at least a portion of said inturned flange.

10. The cover of claim 9 wherein said opening extends through said inturned flange including said leather layer thereon.

11. The cover of claim 1 wherein said securing member is a securing flange extending away from said top wall inner surface, said securing flange including at least one opening therethrough for attaching said cover to a fixed vehicle portion.

12. The cover of claim 11 wherein said securing flange includes a reduced thickness area extending generally parallel to said top wall and adapted to separate when said tear seam and reduced thickness top wall area are separated by the air bag inflation.

13. The cover of claim 11 including at least a pair of said securing flanges, each of said flanges extending generally transverse to said tear seam including a groove extending generally parallel to said top wall and defining a reduced thickness area adapted to separate when said tear seam and reduced thickness top wall area are separated by the air bag inflation.

14. The cover of claim 11 wherein said top wall includes a periphery, said securing flange being spaced inwardly from said periphery on said top wall inner surface.

15. The cover of claim 11 wherein said top wall includes a periphery, said securing flange being an extension of said side wall and aligned with said periphery.

16. The cover of claim 1 wherein said top wall is molded from a material selected from the group consisting of 1) polypropylene, 2) polystyrene, 3) acrylonitrile-butadiene-styrene (ABS), 4) thermoplastic olefin (TPO), 5) thermoplastic urethane (TPU), 6) polyphenylene oxide (PPO), and 7) Kraton (T. M.).

17. A cover for housing an occupant restraint air bag in a vehicle, said cover comprising:
a top wall having an outer surface adapted to face toward the interior of a vehicle when installed and an inner surface, a side wall extending at an angle and joined to said top wall and having outer and inner surfaces, and at least one securing member on said top wall for attaching said cover to a fixed vehicle portion over an inflatable air bag, at least said top wall and side wall being molded from resinous, plastic material;
said top and side wall outer surfaces being covered with and joined to a layer of natural leather, said leather layer being a preformed, preshrunk, preshaped leather piece including a top portion and a side portion, said leather layer extending from said top portion to said side portion such that it generally conforms to the desired shape of said cover prior to joining to said top wall and side wall, having an exposed surface and an interior surface, and including a frangible tear seam formed in a desired tear pattern on said interior surface, said tear seam having an indentation forming a reduced thickness portion in said leather layer;
said top wall having a groove defining a reduced thickness area aligned and in registry with said indentation of said tear seam;
said resinous plastic material of said top and side wall outer surfaces being securely bonded and joined to said interior surface of said leather layer including said top and side portions during molding of said top and side walls, said top wall extending into said tear seam indentation and bonded to said indentation therewithin whereby said leather layer is smoothly and uniformly attached to said top and side walls without substantial distortion and said cover is frangible along said tear pattern through said aligned tear seam indentation and top wall groove for separation to release the air bag when pressure is applied to said top wall inner surface upon inflation of said air bag;
an indented groove on said exposed leather surface, said groove extending along and being co-extensive with at least a portion of said tear seam;
said exposed leather surface being embossed during manufacture with a predetermined pattern which remains visible in said exposed leather surface;
said predetermined pattern being a leather grain to enhance the appearance of the natural grain of said exposed surface of said leather layer;
said aligned tear seam and reduced top wall thickness including a series of spaced perforations therealong to facilitate separation of said cover along said tear seam pattern.

18. The cover of claim 17 wherein said top wall inner surface includes said groove and at least one additional reduced thickness area spaced from said groove to define a hinge area in said cover.

19. The cover of claim 17 wherein said top wall is molded against said leather interior surface, said interior surface of said leather layer including an adhesive primer which promotes adherence and bonding of said leather to said top and side wall outer surfaces.

20. A cover for housing an occupant restraint air bag in a vehicle, said cover comprising:
a top wall having an outer surface adapted to face toward the interior of a vehicle when installed and an inner surface, a side wall extending at an angle and joined to said top wall and having outer and inner surfaces, and at least one securing member extending from said top wall for attaching said cover to a fixed vehicle portion over an inflatable air bag, said top wall and side wall and securing member being molded in one piece from a moldable, resinous material;

said top and side wall outer surfaces being covered and integrally joined by molding to the interior surface of a layer of natural leather having an exposed surface and an interior surface, said natural leather layer being in the form of a preformed leather piece which is preshrunk and preshaped and including a top portion and a peripheral side portion, said preformed leather layer extending from said top portion to said side portion such that it is shaped to the desired shape of said cover prior to being joined to said top wall, said preformed leather layer having a tear seam formed in a desired tear pattern on said interior surface, said tear seam including an indentation forming a reduced thickness portion along said tear pattern in said preformed leather layer;

said top wall inner surface having a groove defining a reduced thickness area aligned and in registry with said indentation of said tear seam along said tear pattern;

said resinous plastic material of said top and side wall outer surfaces being molded to and bonded with said tear seam indentation and to said interior surface of said preformed leather layer including said top and peripheral side portions such that said top wall extends into said tear seam indentation and is bonded to said indentation therewithin whereby said leather layer is smoothly and uniformly secured to said top and side walls without substantial distortion and said cover is frangible along said tear pattern through said aligned tear seam indentation and top wall groove to release the air bag when pressure is applied to said top wall inner surface upon inflation of the air bag.

21. The cover of claim 20 wherein said interior surface of said leather layer includes an adhesion promoting primer which promotes adherence and bonding of said leather to said top and side wall outer surfaces.

22. A molded resinous plastic article having a covering layer of leather having a predetermined pattern therein, said article comprising:
- a natural leather covering layer having inside and outside surfaces and a backing layer molded from resinous, plastic material securely joined to said inside leather surface during molding, said leather covering layer being a preformed leather piece which is preshaped and preshrunk using heat and includes a top portion and a side portion, said leather extending from said top portion to said side portion such that it generally conforms to the desired shape of said article prior to molding of said backing layer;
- said outside leather layer surface having a leather graining pattern embossed therein and exposed for viewing on said article to provide a naturally appearing leather grain while helping to hide surface imperfections in said leather;
- said inside leather layer surface having leather strands, filaments and projections thereon which are securely embedded within said resinous backing layer during molding such that said leather layer and resinous backing layer are strongly bonded to one another during molding.

23. The article of claim 22 wherein said outside leather layer surface also includes indicia embossed therein during molding.

24. The article of claim 22 wherein said inside surface of said leather layer includes an adhesive primer which promotes adherence and bonding of said leather to said backing layer.

25. A cover for housing an occupant restraint air bag in a vehicle, said cover comprising:
- a top wall having an outer surface adapted to face toward the interior of a vehicle when installed and an inner surface, a side wall extending at an angle and joined to said top wall and having outer and inner surfaces, and at least one securing member on said top wall for attaching said cover to a fixed vehicle portion over an inflatable air bag, at least said top wall and side wall being molded from resinous plastic material;
- a natural leather covering layer extending over and securely joined to said resinous, plastic top and side walls during molding of said top and side walls and having inside and outside surfaces, said leather covering layer being a preformed leather piece which is preshaped and preshrunk using heat and includes a top portion and a side portion, said leather extending from said top portion to said side portion such that it generally conforms to the desired shape of said cover prior to molding of said top and side walls, said inside surface of said leather layer having strands, filaments and projections thereon which are securely embedded within said resinous top and side walls during molding such that said leather covering layer and said resinous top wall are securely bonded to one another during molding with said top and side walls forming a backing layer for said leather covering layer;
- at least one of said top wall and said leather covering layer having a reduced thickness portion defining a desired frangible tear pattern in said cover whereby said cover is frangible along said tear pattern to release the air bag when pressure is applied to said top wall inner surface upon inflation of the air bag.

26. The cover of claim 25 wherein said outside surface of said leather covering layer includes a leather graining pattern embossed therein and exposed for viewing on said cover to provide a naturally appearing leather grain while helping to hide surface imperfections in said leather layer.

27. A molded resinous plastic article having a covering layer of leather comprising:
- a natural leather covering layer having inside and outside surfaces and a backing layer molded from resinous, plastic material securely joined to said inside leather surface during molding, said leather covering layer being a preformed leather piece which is preshaped and preshrunk and includes a top portion and a side portion, said leather extending from said top portion to said side portion such that it generally conforms to the desired shape of said article prior to molding of said backing layer;
- said inside leather layer surface being securely bonded to said resinous backing layer during molding whereby said leather layer is smoothly and uniformly attached to said backing layer without substantial distortion.

* * * * *

UNITED STATES PATENT AND TRADEMARK OFFICE
CERTIFICATE OF CORRECTION

PATENT NO. : 5,335,935
DATED : August 9, 1994
INVENTOR(S) : Gary K. Proos et al.

It is certified that error appears in the above-indentified patent and that said Letters Patent is hereby corrected as shown below:

```
Column 7, line 40
After "inches" insert --.--;

Column 8, line 21
"toughened" should be --roughened--; and

Column 9, line 67
"Just" should be --just--.
```

Signed and Sealed this

Twenty-eight Day of February, 1995

Attest:

BRUCE LEHMAN

*Attesting Officer*      *Commissioner of Patents and Trademarks*